United States Patent
Nomura

[15] 3,656,680
[45] Apr. 18, 1972

[54] APPARATUS FOR SIMULTANEOUSLY WELDING PAIRS OF REINFORCING PLATES TO A BASE PLATE

[72] Inventor: Hirokazu Nomura, Yokohama, Japan
[73] Assignee: Nippon Kokan Kabushiki Kaisha, Tokyo, Japan
[22] Filed: Mar. 20, 1970
[21] Appl. No.: 21,395

[52] U.S. Cl..................................228/44, 29/200 P, 29/462, 219/124, 228/4, 228/25, 228/45
[51] Int. Cl..................................................B23k 19/00
[58] Field of Search..................29/200 P, 200 J, 462; 228/4, 228/6, 44, 45; 114/77 A, 77 R, 65, 0.5; 219/124, 125

[56] References Cited

UNITED STATES PATENTS 2,288,796  7/1942  Edwards..............................29/200 J
2,342,179  2/1944  Ciesa et al............................29/200 J
3,164,713  1/1965  Banks et al..........................219/124

Primary Examiner—John F. Campbell
Assistant Examiner—Robert J. Craig
Attorney—Steinberg & Blake

[57] ABSTRACT

An apparatus for welding reinforcing plates to a base plate. Two pairs of welding means respectively simultaneously deposit fillet welds at all four corners defined between the lower edges of a pair of upright reinforcing plates and the upper surface of a main base plate engaged by these lower edges, so that a pair of T-welds are simultaneously formed between the two reinforcing plates and the main base plate. After one pair of reinforcing plates are simultaneously welded in this manner to the main base plate, a second pair of reinforcing plates are simultaneously welded in the same way to the main base plate, so that pairs of T-welds are formed successively between pairs of the reinforcing plates and the main base plate.

5 Claims, 4 Drawing Figures

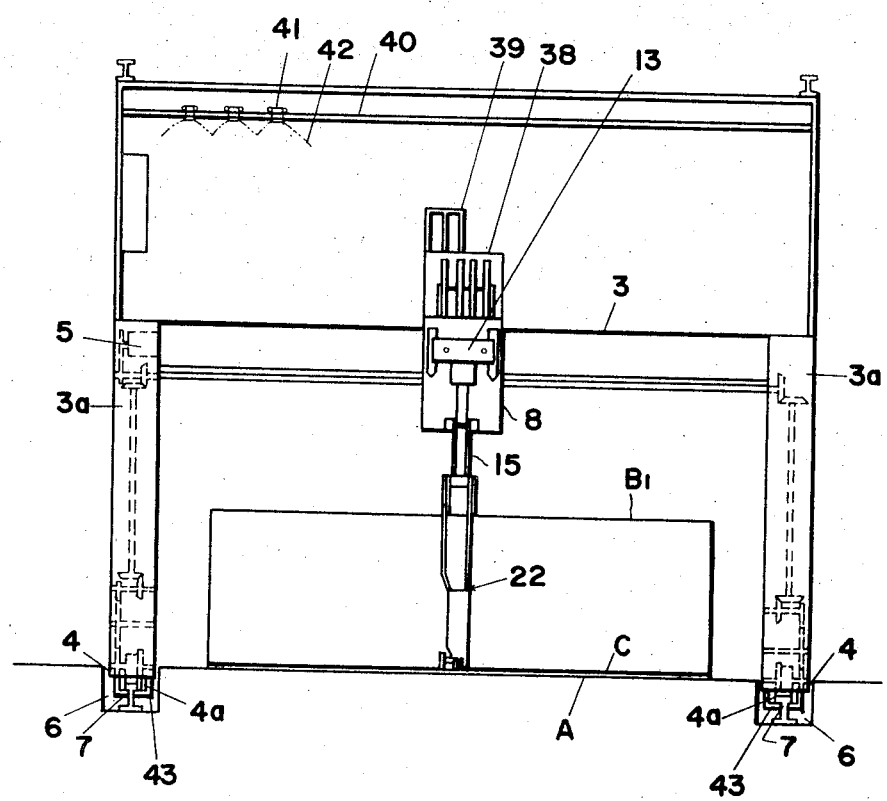

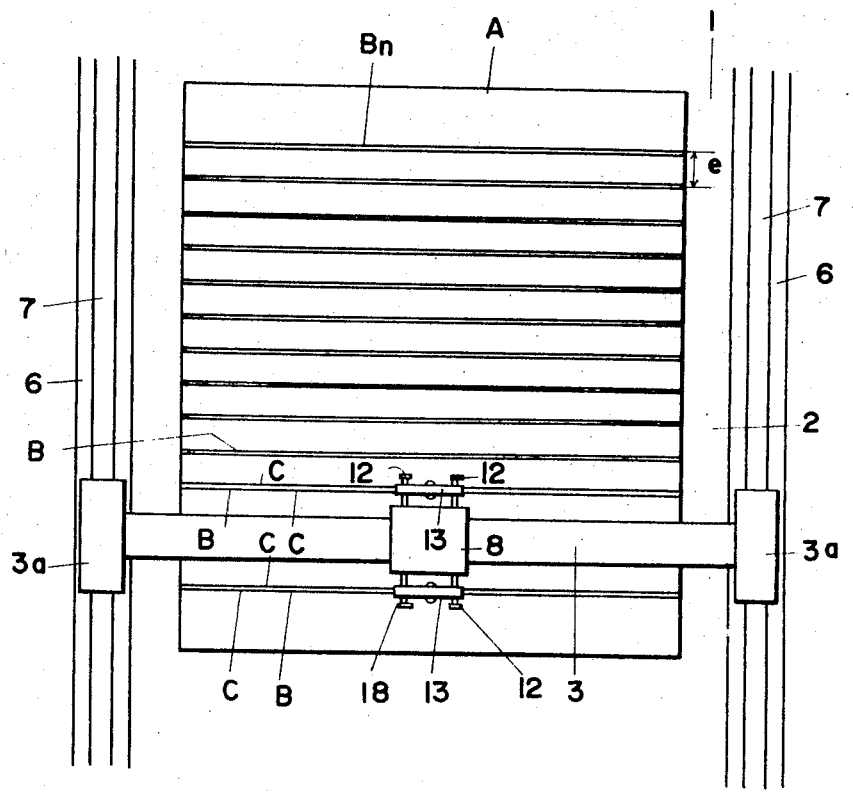

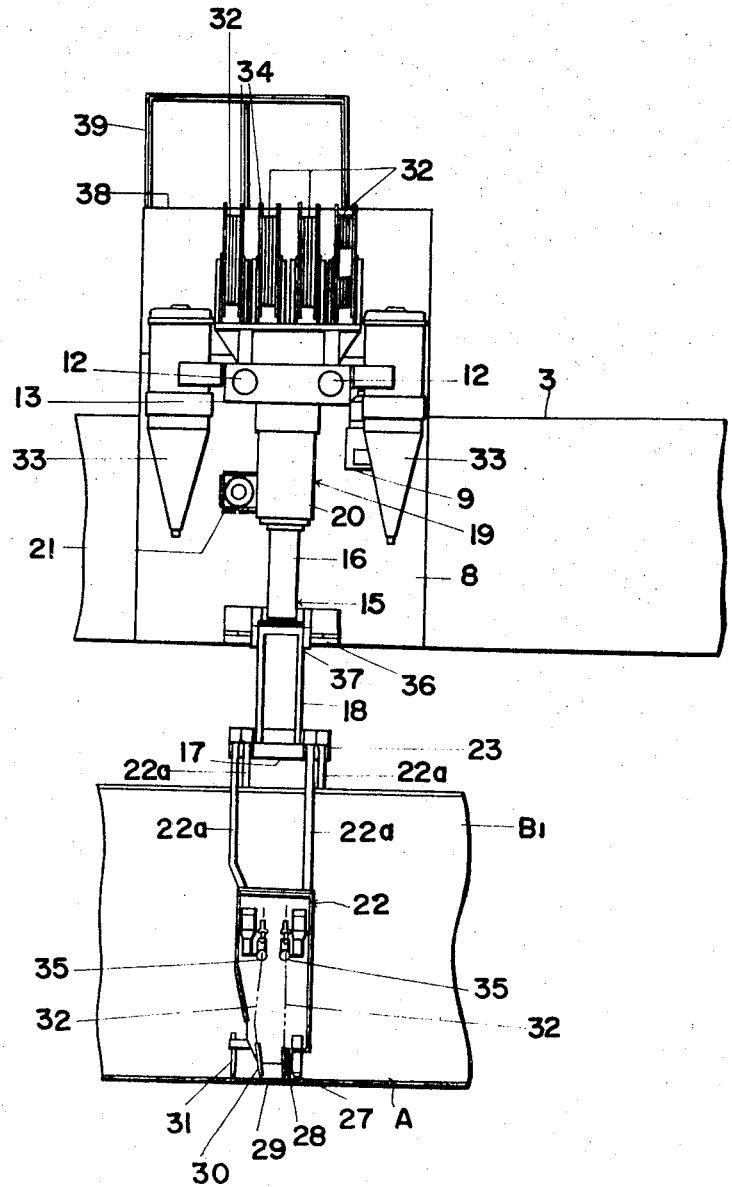

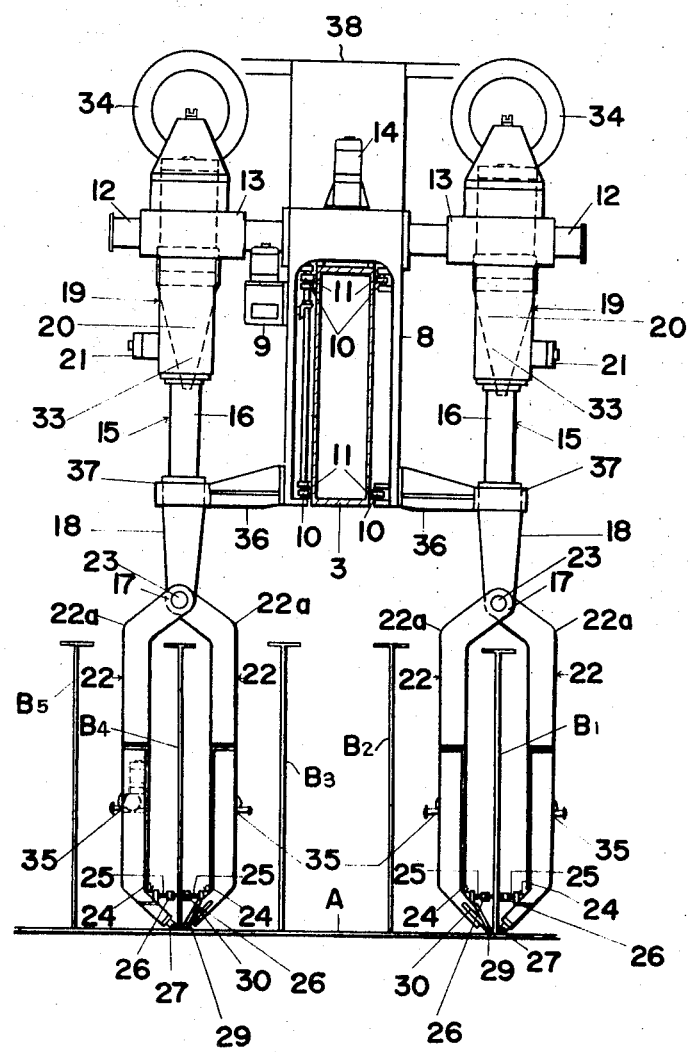

APPARATUS FOR SIMULTANEOUSLY WELDING PAIRS OF REINFORCING PLATES TO A BASE PLATE

BACKGROUND OF THE INVENTION

The present invention relates to welding.

In particular, the present invention relates to the formation of T-welds between reinforcing plates and a base plate. Such welds are commonly provided, for example, in shipbuilding. For example reinforcing plates may be welded to a main plate so as to form stringers or frames for the hold of a vessel. During the manufacture of such structures it is possible to arrange a series of reinforcing plates with their lower edges engaging the upper surface of a main base plate, so that each reinforcing plate defines a pair of longitudinal corners extending along its lower edge where this edge engages the upper surface of the main plate. Fillet welds can then be deposited in these corners, either by manual welding or by gravity welding, as is conventional at the present time, and in this way a series of reinforcing plates are joined to the main plate so as to form T-welds therewith. However, experience has shown that a considerable amount of time and labor is undesirably involved in the successive deposition of the fillet welds in these corners defined between the reinforcing plates and the base plate. As a result the output is extremely low and the costs are undesirably high, so that the efficiency of the entire operation is at an extremely low level with the conventional procedures referred to above.

SUMMARY OF THE INVENTION

It is accordingly a primary object of the present invention to provide an improvement in the above conditions.

In particular, it is an object of the invention to provide an apparatus which will make it possible to greatly increase the output of the above operations without however in any way detracting from the quality of the work.

Furthermore it is an object of the invention to provide an apparatus which make it possible to weld simultaneously with the base plate more than one reinforcing plate, so that only relatively small fraction of the time and labor normally required in the above operations will be required with the apparatus of the invention.

According to the invention there are at least two pairs of welding means one pair for simultaneously depositing fillet welds along the corners defined between the lower edge of one reinforcing plate and the base plate and the other pair for simultaneously depositing fillet welds along the corners defined between the lower edge of another reinforcing plate and the base plate. These two pairs of welding means are carried by a common carriage means which is supported by a transverse beam of a crane for movement along this transverse beam. The transverse beam extends parallel to the corners which receive the fillet welds, so that with this apparatus, four fillet welds are simultaneously deposited along the corners defined between a pair of lower edges of a pair of reinforcing plates and the base plate, thus forming a pair of T-welds simultaneously between a pair of upright reinforcing plates and the main base plate.

BRIEF DESCRIPTION OF DRAWINGS

The invention is illustrated by way of example in the accompanying drawings which form part of this application and in which:

FIG. 1 is a schematic transverse elevation showing the bridge crane of the welding apparatus and the structure carried thereby as it appears when viewed in a plane which is parallel to the plurality of upright reinforcing plates;

FIG. 2 is a schematic fragmentary top plan view of the apparatus of FIG. 1, FIG. 2 clearly illustrating the series of upright reinforcing plates as they appear when looking down onto the main base plate, and FIG. 2 further illustrating the manner in which the bridge crane is guided for movement along the main base plate over the several reinforcing plates;

FIG. 3 is a fragmentary elevation taken in the same plane as FIG. 1 but showing in greater detail, at a scale which is enlarged as compared to FIG 1, the structure at the central part of FIG. 1 where the welding apparatus is carried by the crane; and FIG. 4 is a fragmentary longitudinal sectional elevation taken in a plane parallel to the direction of movement of the crane means, transversely of the several upright reinforcing plates, showing in detail the manner in which the apparatus and method of the invention operate to carry out the simultaneous formation of T-welds between successive pairs of upright reinforcing plates and the main base plate.

DESCRIPTION OF PREFERRED EMBODIMENTS

Referring first to FIGS. 1 and 2, it will be seen that the main base plate A is conveyed through any suitable unillustrated conveyor structure which does not form part of the invention along the conveyor line 1 which extends perpendicularly to the plane of FIG. 1. A series of upright reinforcing plates $B_1$, $B_2$ ... $B_n$ are arranged parallel to each other on the main plate A with the lower edges of the reinforcing plates engaging the upper surface of the main base plate A. The several reinforcing plates thus are perpendicular to the main base plate A, and they may be situated from each other by a distance such as the distance $e$, indicated at the upper right portion of FIG. 2. This distance may be equal between the several upright reinforcing plates, and it may have any selected value, although for other purposes it is not at all essential to provide equal increments between the series of reinforcing plates. The work is illustrated in FIGS. 1 and 2 at the welding station 2 where the T-welds are formed between the upright reinforcing plates and the main base plate. However, prior to being conveyed to the welding station 2 the several upright reinforcing plates are temporarily joined, as by tack welding, to the base plate A. Thus the work reaches the welding station 2 with the upright reinforcing plates temporarily fastened to the base plate A. At the welding station 2 the fillet welds are automatically deposited at the corners defined between the lower edges of the reinforcing plates and the upper surface of the main plate A, in a manner described in greater detail below.

A plurality of welding means are carried by a carriage means 8, schematically represented in FIGS. 1 and 2. This carriage means 8 is supported for movement on a transverse beam 3 of a bridge crane which forms a crane means which carries the carriage means 8. This bridge crane includes a pair of opposed uprights 3a which support the transverse beam 3 at the ends of the latter. Thus, the transverse beam 3 extends parallel to the series of upright reinforcing plates while being situated thereover. Of course the carriage means 8 will be guided for movement by the transverse beam 3 in a direction parallel to the upright reinforcing plates.

The pair of uprights 3a of the bridge crane are respectively provided at their bottom ends with assemblies 4 which support wheels 4a for rotary movement, at least two wheels being provided at the lower end of each upright 3a. At the upper region of the left upright 3a of FIG. 1, this upright houses a motor 5 which through the schematically illustrated bevel gear transmission drives the wheels 4a. This drive to the wheels includes suitable gear reductions as well as meshing gear drives which make it possible to bring about both forward and rearward movement of the crane means. In order to guide the crane means for movement the wheels 4a roll along the rails 7 which are situated within the parallel trenches 6 which are formed in the floor of the plant, in the manner shown schematically in FIGS. 1 and 2. Thus the entire crane means is capable of moving in either direction transversely of the upright reinforcing plates and longitudinally of the main base plate A in the direction which the latter is conveyed to and from the welding station 2.

As is illustrated most clearly in FIG. 4, the carriage means 8 is of a generally saddle-shaped configuration and extends over the top at along both of the sides of the transverse beam 3 of the crane means. In order to drive the carriage means 8 in both directions along the beam 3 a drive 9, in the form of a motor and a suitable reduction gearing, for example, is carried by the carriage means 8 at one side thereof, and the drive from the motor 9 is transmitted through suitable transmission components to pinions 10 meshing with racks 11 which are fixed to the outer side surfaces of the beam 3 in the manner shown in FIG. 4. Thus FIG. 4 schematically shows a bevel gear transmission transmitting the drive from the motor and the gear reduction 9 to the pinions 10 which mesh with the racks 11. At the right side of the beam 3, as viewed in FIG. 4, it is possible to provide only freely rotary idle pinions 10 meshing with the racks 11 so that the drive will take place only at the left side, as viewed in FIG. 4. At the front and rear of the carriage means 8, which is to say at the right and left sides thereof, as viewed in FIG. 4, there are adjusting means and connecting means through which the carriage means 8 is connected with two pairs of welding means, one pair of welding means 22 being shown at the lower right portion of FIG. 4 and the other pair of welding means 22 being shown at the lower left portion of FIG. 4.

For the purpose of adjusting the distance between these two pairs of welding means, the apparatus includes an adjusting means. This adjusting means includes two pairs of rotary screws 12, one pair of rotary screws 12 projecting rearwardly from one side of the upper region of the carriage 8 and the other pair of screws 12 projecting from the opposite side of the upper region of the carriage 8. Thus the pairs of rotary screws 12, all of which have parallel horizontal axes, extend perpendicularly to the uprights $B_1, B_2 \ldots B_n$. Carriers 13 are formed with threaded bores which mate with and through which the screws 12 extend, and these screws 12 are rotated through unillustrated drives from a motor 14 carried by the upper part of the carriage 8. Thus the motor 14 can be energized, either in one direction or the other, for rotating the screws 12 in selected directions for causing the carriers 13 to approach or move away from each other, and in this way the distance therebetween is adjusted.

The pair of connecting means 15 for respectively connecting the pairs of welding means to the carriage means 8 through the above-described pair of adjusting means includes the pair of vertically extending shafts 16 extending into tubular housings 19 which are fixedly carried by the carriers 13. These shafts 16 respectively have upper cylindrical portions 20 which are axially movable up and down within the housings 19. These cylindrical portions 20 are suitably keyed or splined to the housings 19 in the interior thereof so that the portions 20 together with the shaft 16 can move vertically while being incapable of rotating about their vertical axes. In order to raise and lower the portions 20 they may fixedly carry axially extending racks meshing with pinions rotated by motors 21 which through suitable reduction gearing act on such pinions, these motors 21 being shown in the drawings carried by the pair of housings 19 at the exterior thereof. However, other arrangements are possible such as an arrangement of nuts threaded onto the portions 20 and having worm teeth formed at their outer surfaces and meshing with worms which are rotated by the motors 21, so that through such a worm drive it is possible to rotate the nuts and through threaded connection between the latter and the portions 20 raise and lower the latter.

The pair of connecting means 15 terminate at their lower ends in bearings 17 on which the several welding means 22 are freely swingable. For this purpose the lower end of shaft 16 of each connecting means carries a clevis 18 (FIG. 3) which at its bottom end carries an elongated supporting pin 23, and it is on this supporting pin 23 that the several welding means 22 are freely swingable.

As is apparent from FIG. 4, each of the welding means 22 has its center of gravity situated in a plane spaced from a plane which contains the axis of the supporting pin 23, so that as a result the pair of welding means 22 supported by each pin 23 is urged by gravity to swing inwardly at its bottom ends, thus causing the lower end regions of each pair of welding means 22 to approach each other and thus press into the pair of corners formed by the lower edge of a reinforcing plate and the upper surface of the main plate A engaged by this lower edge. Thus it will be seen from FIG. 4 that each welding means 22 has at its upper region the inclined portion 22a which terminates in the eyes through which the pin 23 extends. The lower end regions of the pair of welding means 22 are oppositely inclined and carry the welding components which are described in greater detail below.

The lower end of each welding means 22 is provided with a fluid pressure structure including the fluid pressure cylinder 24 from which a piston 25 projects, this piston carrying a wheel 26 which is adapted to engage a side surface of an upright reinforcing plate. Thus, while forces of gravity urge the lower ends of the welding means into the corners which are to receive the fillet welds, a suitable rolling contact is provided with the upright reinforcing plates through the rollers 26 which can be adjusted by way of a fluid pressure means 24,25, connected to each welding means.

As is shown most clearly in FIG. 3, each welding means includes at its lower leading end a stylus roller 27 which extends into the corner which receives the fillet weld and which leads the welding structure which participates more directly in the deposition of the fillet weld. This latter welding structure includes, in sequence trailing behind the leading stylus roller at the bottom end of each welding means a flux-spraying nozzle 28 which sprays flux to the area where the welding takes place, a first welding electrode 29, a second welding electrode 30, and a flux-retrieving tube 31. The stylus rollers 27 guide the several welding means for movement along the welding lines C shown in FIG. 2. The filler material takes the form of wire welding rods 32 which are converted into molten metal at their lower ends by the electrodes 29, 30, simultaneously with the supply of flux spraying from the nozzle 28 while welding is carried out. Excess flux is retrieved through the pipe 31. The nozzle 28 and pipe 31 are connected through suitable tubes with separating tanks 33 so that the excess flux is delivered back to the tank where impurities are separated out of the flux before it is again recirculated back to the supply nozzle 28. These separating tanks are carried by carriers 13 in the manner shown most clearly in FIGS. 3 and 4, and the tubular connections between the tanks 33 and the components 28 and 31 are omitted for the sake of clarity.

The welding rod 32 is derived from coils 34. Thus, each carriage means 8 carries at its upper region four reels 34 of the wire welding rod 32 which is fed from the reels and advanced to the welding location by the rod feeding units 35 shown most clearly in FIG. 3, these units automatically operating to feed the welding rod at the required rate to the welding location.

The opposed sides of the carriage 8 respectively carry steadying projections 36 which project forwardly and rearwardly. These projecting members 36 are respectively formed at their outer ends with elongated slots or notches 37 through which the upper ends of the clevises 18 extend in the manner shown in FIG. 4. The parts 37 may terminate in outer open ends so that they are of a C-shaped configuration, and in this way sufficient clearance is provided for the forward and rearward movement of the pair of welding means in response to rotary movement of the screws 12 as described above.

The upper region of the carriage means 8 also carries a suitable stand or cage 38 for the operator, and, as shown in FIG. 1, a handrail 39 may also be provided for the convenience of the operator at the location 38 from which the operator may oversee the operations.

The upper part of the bridge crane also carries a framework which includes the transverse rail 40 on which trolleys 41 are freely movable, these trolleys carrying the power supply cables 42 which are electrically connected to the structure so as to supply the power thereto. At the lower regions of FIG. 1 there are schematically illustrated rail clamps 43 capable of releasably clamping the rails 7 to fixedly hold the crane means at a location to which it has been moved in preparation for a cycle of welding operations. These clamps 43 can be released when the crane means is to be moved along the rails 7. With the structure described above it becomes possible to weld a pair of reinforcing plates simultaneously to the base plate A. When this base plate is conveyed, with reinforcing plates tack-welded thereto, the welding station 2, the base plate and reinforcing plates thereon are fixed in the working position. Then the motor 14 is actuated to operate the adjusting means for moving the pairs of welding means toward or away from each other so as to provide therebetween the distance corresponding to that between the pair of reinforcing plates which are to be simultaneously welded to the main plate. In the example shown in FIG. 4, it will be seen that it is the pair of reinforcing plates $B_1$ and $B_4$ which are simultaneously welded to the main plate A. Assuming that the crane means has been fixed by clamps 43 at a location such as that indicated in FIG. 4 and that the distance between the pairs of welding means has also been adjusted to the condition illustrated in FIG. 4, the carriage means 8 will be situated at one end of the beam 3 with the pairs of welding means aligned with the plates $B_1$ and $B_4$ but still out of engagement with the latter. The welding means 22 of each pair can be swung apart from each other to an open position, for example, by extending the pistons 25 out of the cylinders 24 so that the rollers 26 engage each other to swing the pair of welding means 22 apart from each other about the supporting pin 23. In this condition the carriage can be advanced along the beam 3 so that the rollers 26 will simply engage and be pushed apart by the thickness of the plate while rolling along the opposed side surfaces thereof, and now the fluid pressure devices 24, 25, can be actuated to cause the lower ends of the pair of welding means to swing inwardly toward each other with the stylus rollers 27 reaching precisely into the corners, and for this purpose, if necessary, the motors 21 will be actuated to raise and lower the entire assemblies so that a very precise positioning of the four welding means with respect to the four corners which are to receive the fillet welds is achieved. The several stylus rollers 27 extend all the way up to the intersections between the upright reinforcing plates $B_1$, $B_4$, and the upper surface of the main plate A.

The welding operations are automatically started as soon as the first and second electrodes, 29, 30, after having been properly adjusted, reach the welding location so that in a fully automatic manner the structure can sense that the leading stylus rollers 27 have started to move along the corners and the flux will start spraying from the nozzles 28 into the corners while the welding rod will be automatically delivered to be melted and deposited in the form of fillet weld along the several corners. The carriage means 8 is advanced through the drive 9 and the transmission connected thereto and described above so that all four welding means simultaneously operate thus providing the simultaneous T-welds between the reinforcing plates $B_1$, $B_4$ and the main plate A in a fully automatic manner with all of the fillet welds being simultaneously deposited at the same rate along the four corners as the opposite ends of the latter are approached by the several welding means. When the end of the work is reached, this condition also is automatically sensed and resulting operations are automatically terminated through the electrical circuitry. Thus, the feeding of the welding rod will terminate and the spraying of the flux will also terminate. The fluid pressure devices are again actuated to spread apart the pairs of welding means and they can be elevated also, and with the parts in this condition the carriage 8 is returned to its starting position.

Assuming that the distance $e$ between the successive reinforcing plates is the same, it is only necessary to move the bridge crane through this distance $e$, so that now the pairs of welding means will be situated respectively in alignment with the reinforcing plates $B_2$ and $B_5$ precisely in the same way that they were previously aligned with reinforcing plates $B_1$ and $B_4$. Now the above operations can be repeated at the second pair of reinforcing plates $B_2$, $B_5$. In this way a series of the above operations can be cyclically carried out in a fully automatic manner through suitable electrical controls.

Inasmuch as the bridge crane can move back and forth along the base plate while the carriage can move transversely thereof parallel to the reinforcing plates, only one supporting assembly need be provided for all four welding means. Nevertheless it is clear from the above description that all of the welding means can be very precisely adjusted with respect to the work. Thus, not only are both corners defined between the lower edge of one reinforcing plate and the upper surface of the main plate simultaneously welded by simultaneous deposition of fillet welds therein, but in addition these operations are also taking place simultaneously at a second reinforcing plate, thus providing an exceedingly great output and resulting in a very substantial increase in the efficiency of the operation, as contrasted with the conventional operations. Inasmuch as there are two pairs of welding means which are simultaneously moved along the corners which receive the fillet welds, it is a simple matter to provide at the end of one cycle of welding operations a movement of the entire unit through the bridge crane parallel to the plate A to situate the several welding means in position for the next cycle of operations. It is emphasized that through the above adjusting means the structure is not at all limited to work where the several reinforcing plates are located at equal distances from each other. These distances may be different since the structure can adjust itself to such condition. Furthermore, because of the fact that the welding means of each pair can be swung toward and away from each other the welding means of the invention can easily be adapted to plates of any thickness thus enabling extremely satisfactory fillet welds to be deposited without any restriction as to the length of the reinforcing plates, the thickness thereof or the thickness of the fillets, or the intervals between the several reinforcing plates.

I claim:

1. In an apparatus for welding a plurality of upright reinforcing plates to a main base plate having an upper surface engaged by lower edges of the reinforcing plates so that each of the latter defines with the upper surface of the base plate a pair of elongated corners for receiving fillet welds to form T-welds between the several upright reinforcing plates and the base plate, at least two pairs of welding means one for simultaneously depositing fillet welds in the corners defined by the lower edge of one upright reinforcing plate and the upper surface of the base plate and the other for simultaneously depositing a pair of fillet welds in the corners defined between the lower edge of another upright reinforcing pate and the upper surface of the base plate, carriage means carrying said pairs of welding means for simultaneously moving them along the four corners defined between the latter upright reinforcing plates and the base plate so as to simultaneously weld both of the latter reinforcing plates to the base plate with a pair of fillet welds simultaneously deposited at the corners defined by each of the latter reinforcing plates with the base plate, and crane means carrying said carriage means, said carriage means being operatively connected with the pairs of welding means for moving the latter along the said corners defined between the reinforcing plates and base plate and said crane means carrying said carriage means and the pairs of welding means with the latter for movement perpendicularly to the latter corners transversely of the upright reinforcing plates.

2. The combination of claim 1 and wherein an adjusting means is operatively connected with the pairs of welding means for adjusting the distance therebetween in accordance with the distance between the pair of upright reinforcing plates which are simultaneously welded to the base plate.

3. The combination of claim 2 and wherein said crane means is a bridge crane having a pair of opposed uprights between which the main plate extends with the reinforcing uprights thereon, and an upper transverse beam extending between and carried by said uprights and supporting said carriage means for movement, said beam extending parallel to the corners which receive the fillet welds.

4. The combination of claim 3 and wherein one of said pairs of welding means is situated on one side of said carriage means and the other of said pairs of welding means is situated on the other side of said carriage means with the latter and said transverse beam of said crane means situated over a space between the pairs of welding means, said adjusting means including a pair of rotary screws carried by said carriage means and extending therefrom perpendicularly to said transverse beam, a pair of carriers threaded on said screws for movement axially thereof in response to rotary movement of said screws, said carriers respectively carrying said pairs of welding means, and a drive operatively connected to said screws for rotating the latter, so that with said adjusting means it is possible to precisely adjust the distance between the pairs of welding means.

5. The combination of claim 4 and wherein a pair of connecting means respectively connect said pairs of welding means to said carriers, said pair of connecting means respectively having bottom ends carrying supporting pins which extend parallel to said transverse beam, and each pair of welding means including a pair of welding units freely swingable on a supporting pin and respectively having centers of gravity spaced on opposite sides of a vertical plane which contains the axis of the supporting pin, so that each pair of welding means has a pair of lower ends which tend to swing inwardly toward each other, and the lower ends of each pair of welding means being located at a pair of corners defined between the lower edge of an upright reinforcing plate and the upper surface of the main plate.

* * * * *